(12) United States Patent
Yang

(10) Patent No.: US 9,229,150 B2
(45) Date of Patent: *Jan. 5, 2016

(54) BACKLIGHT MODULE AND LCD COMPRISING THE SAME

(71) Applicant: Shenzhen China Star Optoelectronics Technology Co., Ltd., Shenzhen, Guangdong (CN)

(72) Inventor: Ruilian Yang, Guangdong (CN)

(73) Assignee: SHENZHEN CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 153 days.

This patent is subject to a terminal disclaimer.

(21) Appl. No.: 14/044,883

(22) Filed: Oct. 3, 2013

(65) Prior Publication Data

US 2014/0036530 A1 Feb. 6, 2014

Related U.S. Application Data

(63) Continuation of application No. 13/376,837, filed on Dec. 7, 2011, now Pat. No. 8,651,722.

(30) Foreign Application Priority Data

Oct. 14, 2011 (CN) .......................... 2011 2 0393253

(51) Int. Cl.
*G09F 13/04* (2006.01)
*G09F 13/08* (2006.01)
*G02F 1/1335* (2006.01)
*F21V 8/00* (2006.01)

(52) U.S. Cl.
CPC ............ *G02B 6/0043* (2013.01); *G02B 6/0061* (2013.01); *G02B 6/0068* (2013.01); *G02F 1/1336* (2013.01); *G02F 1/133603* (2013.01); *G02F 1/133615* (2013.01); *G02F 1/133611* (2013.01)

(58) Field of Classification Search
CPC .. G02B 6/0015; G02B 6/0016; G02B 6/0018; G02B 6/002; G02B 6/0021; G02B 6/0043; G02B 6/0061
USPC .................................. 362/606, 607, 615–629
See application file for complete search history.

(56) References Cited

U.S. PATENT DOCUMENTS 6,402,335 B1 * 6/2002 Kalantar et al. .............. 362/619
6,419,372 B1 * 7/2002 Shaw et al. .................... 362/231

(Continued)

FOREIGN PATENT DOCUMENTS

CN 101672455 A * 3/2010
KR 20090008749 U * 8/2009

*Primary Examiner* — Peggy Neils
*Assistant Examiner* — Alexander Garlen

(57) ABSTRACT

A backlight module comprises a backplate having a baseplate and side plates, a direct-lit LED array, edge-lit LED arrays and a light guide panel. The light guide panel is located above the baseplate. The direct-lit LED array is disposed between the baseplate and the light guide panel. The edge-lit LED arrays are disposed at two sides of the light guide panel and facing light incident surfaces thereof respectively. Light scattering structures for scattering light rays are disposed on a light exiting surface or on a bottom surface of the light guide panels. With the LED arrays and the light scattering structures, the light guide panel is divided into three backlight regions. Displaying of the backlight module is controlled region by region by the light scattering structures and the LED drive circuit to improve the brightness of the backlight module and reduce the power consumption of the liquid crystal module.

19 Claims, 3 Drawing Sheets

(56) References Cited

U.S. PATENT DOCUMENTS

| | | | |
|---|---|---|---|
| 6,842,204 B1 * | 1/2005 | Johnson | 349/74 |
| 7,036,946 B1 * | 5/2006 | Mosier | 362/23.08 |
| 7,753,579 B2 * | 7/2010 | Kim | 362/620 |
| 2007/0147073 A1 * | 6/2007 | Sakai et al. | 362/607 |

* cited by examiner

BACKLIGHT MODULE AND LCD COMPRISING THE SAME

CROSS REFERENCE TO RELATED APPLICATIONS

This is a continuation of non-provisional application Ser. No. 13/376,837, filed on Dec. 7, 2011 and entitled "BACKLIGHT MODULE AND LCD COMPRISING THE SAME".

BACKGROUND

1. Technical Field

The present disclosure relates to the technical field of liquid crystal 5 displaying, and more particularly, to a backlight module and a liquid crystal display (LCD) comprising the same.

2. Description of Related Art

LCDs currently available all comprise a liquid crystal module and a backlight module adapted to provide backlight for a liquid crystal panel of the liquid crystal module. Because the liquid crystal panel does not emit light by itself, the backlight module must provide a uniform light source having adequate brightness to the liquid crystal panel so that the liquid crystal panel operates to display an image normally.

However, conventional liquid crystal modules using backlight have an invariable power consumption during operation; that is, brightness of the backlight cannot be adjusted according to brightness of an image to be displayed by the liquid crystal module. In other words, the brightness of the backlight cannot be adjusted region by region, and this is unfavorable for energy saving.

Some backlight structures which can adjust the brightness region by region have been proposed. Such backlight structures generally accomplish adjustment of the brightness region by region by splicing light guide panels together. However, this way of splicing light guide panels together causes problems of nonuniform brightness and chromaticity at splicing gaps.

SUMMARY

The primary objective of the present disclosure is to provide a backlight module and a liquid crystal display (LCD) comprising the same, which are intended to reduce the power consumption of the liquid crystal module and improve the effect of adjusting the backlight region by region.

To achieve the aforesaid objective, the present disclosure provides a backlight module, which comprises a backplate, a direct-lit LED array, edge-lit LED arrays and a light guide panel. The backplate comprises a baseplate and side plates. The light guide panel is located between the side plates of the backplate and above the baseplate. The direct-lit LED array is disposed on the baseplate of the backplate and located beneath a middle portion of the light guide panel. The edge-lit LED arrays are disposed at two sides of the light guide panel and opposite to light incident surfaces of the light guide panel respectively. A number of light scattering structures for scattering light rays are disposed on a light exiting surface or on a bottom surface of the light guide panel at both ends of the light guide panel adjacent to the edge-lit LED arrays.

Preferably, the bottom surface of the light guide panel comprises a left region, a middle region and a right region. The light scattering structures on the bottom surface of the light guide panel are disposed in the left region and the right region of the bottom surface. The middle region of the bottom surface faces the direct-lit LED array directly.

Preferably, a density of the light scattering structures disposed in the left region and the right region of the bottom surface of the light guide panel that are away from the edge-lit LED arrays is greater than a density of the light scattering structures that are near the edge-lit LED arrays.

Preferably, the light scattering structures on the bottom surface of the light guide panel extend to an edge of an illuminating region of the direct-lit LED array.

Preferably, the light exiting surface of the light guide panel comprises a left region, a middle region and a right region. The light scattering structures on the light exiting surface are disposed in the left region and the right region of the light exiting surface. The middle region of the light exiting surface faces towards the direct-lit LED array directly. A density of the light scattering structures in the left region and the right region of the light exiting surface of the light guide panel that are away from the edge-lit LED arrays is greater than a density of the light scattering structures that are near the edge-lit LED arrays.

Preferably, the light scattering structures on the light exiting surface of the light guide panel extend to an edge of the illuminating region of the direct-lit LED array.

Preferably, the light scattering structures are mesh point structures or micro-protrusion structures, and a cross section of the light scattering structures is at least one of a hill form, a spherical form, a triangular form, an elliptical form and a diamond form.

Preferably, the light scattering structures on the bottom surface of the light guide panel extend to an edge of the illuminating region of the direct-lit LED array.

Preferably, the light scattering structures on the light exiting surface of the light guide panel extend to an edge of the illuminating region of the direct-lit LED array.

Preferably, two ends of the light guide panel formed with the light scattering structures have a thickness greater than that of the middle portion of the light guide panel that is not formed with the light scattering structures.

Preferably, the baseplate of the backplate is formed with a recessed portion and two supporting portions. The recessed portion is located between the two supporting portions and lower than the supporting portions. The direct-lit LED array is disposed on the recessed portion.

Preferably, the backlight module further comprises a reflective sheet disposed on an upper surface of each of the supporting portions and in spaces between LEDs of the direct-lit LED array.

The present disclosure further provides an LCD comprising the backlight module as described above.

According to the backlight module and the LCD comprising the same of the present disclosure, the direct-lit design and the edge-lit design are used in combination in the backlight module, and a number of light scattering structures for scattering light rays are disposed on the light exiting surface or the bottom surface of the light guide panel at both ends of the light guide panel to divide the light guide panel into three backlight regions. By using the light scattering structures to disrupt the total reflection of light rays inside the light guide panel, regions illuminated by the backlight from the edge-lit LED arrays are controlled by the light scattering structures on the light guide panel while a region illuminated by the backlight from the direct-lit LED array is controlled by the LED drive circuit. In this way, the effect of adjusting the brightness of the backlight of the backlight module region by region is improved and the power consumption of the liquid crystal module is reduced.

Hereinafter, implementations, functional features and advantages of the present disclosure will be further described with reference to embodiments thereof and the attached drawings.

DETAILED DESCRIPTION

It shall be understood that, the embodiments described herein are only intended to illustrate but not to limit the present disclosure.

Embodiments of the present disclosure mainly adopt the following solution: the direct-lit design and the edge-lit design are used in combination in the backlight module, and a number of light scattering structures for scattering light rays are disposed on a light exiting surface or a bottom surface of the light guide panel at both ends of the light guide panel to divide the light guide panel into three 10 backlight regions. Regions illuminated by the backlight from the edge-lit LED arrays are controlled by the light scattering structures on the light guide panel while a region illuminated by the backlight from the direct-lit LED array is controlled by the LED drive circuit. In this way, the effect of adjusting the brightness of the backlight of the backlight module region by region is improved and the power consumption of the liquid crystal module is reduced.

Figure 1:
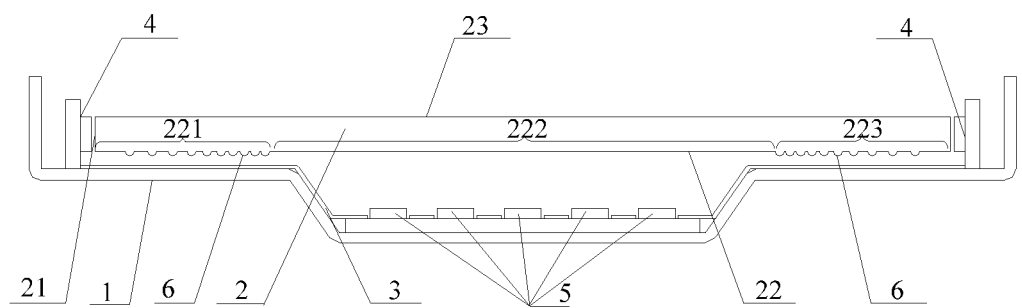
FIG. 1 is a schematic structural view of a first embodiment of a backlight module according to the present disclosure.

As shown in FIG. 1, there is shown a schematic structural view of a first embodiment of a backlight module according to the present disclosure. The first embodiment of the present disclosure provides a backlight module which can control brightness of backlight region by region. The backlight module is an incident backlight module in which the edge-lit design and the direct-lit design are used in combination. The backlight module comprises a backplate 1, a direct-lit LED array 5, edge-lit LED arrays 4, a reflective sheet 3 and a light guide panel 2.

The backplate 1 comprises a baseplate and side plates extending upwards from a periphery of the baseplate. A middle portion of the baseplate is recessed to form a recessed portion, and two sides of the recessed portion form a supporting portion respectively.

The light guide panel 2 is disposed above the baseplate of the backplate 1, and the direct-lit LED array 5 is disposed on the recessed portion of the baseplate of the backplate 1. Specifically, the direct-lit LED array 5 is located between the light guide panel 2 and the recessed portion and fixed on recessed portion.

The reflective sheet 3 is disposed on the supporting portions of the baseplate of the backplate 1 and adapted to reflect light rays. In order to better 5 reflect the light rays, the reflective sheet 3 is also provided in regions between LEDs of the direct-lit LED array 5.

The light guide panel 2 has an upper surface, a lower surface and two side surfaces. The upper surface of the light guide panel 2 is a light exiting surface 23, the lower surface is a bottom surface 22 opposite to the light exiting surface 23, and the two side surfaces are light incident surfaces 21 at two sides of the light guide panel 2.

The edge-lit LED arrays 4 are disposed at the two sides of the light guide panel 2 and opposite to the light incident surfaces 21 of the light guide panel 2 respectively. The edge-lit LED arrays 4 are supported on the supporting portions at two ends of the baseplate of the backplate 1.

In this embodiment, a number of light scattering structures 6 are disposed on the bottom surface 22 of the light guide panel 2 at both ends of the light guide panel 2 adjacent to the edge-lit LED arrays 4. The light scattering structures 6 are adapted to scatter light rays to disrupt the total reflection of light rays inside the light guide panel 2 so that the light rays can be projected outwards from the light guide panel 2.

The light scattering structures 6 may be mesh point structures or micro-protrusion structures, and a cross section of the light scattering structures 6 may be a hill form, a spherical form, a triangular form, an elliptical form, a diamond form or any other form that can disrupt the total reflection of light rays inside the light guide panel 2.

The light scattering structures 6 are distributed to divide the bottom surface 22 of the light guide panel 2 into a left region 221, a middle region 222 and a right region 223. The left region 221 and the right region 223 of the bottom surface 22 of the light guide panel 2 are regions formed with the light scattering structures 6; and the middle region 222 of the bottom surface 22 of the light guide panel 52 is a region that is not formed with the light scattering structures 6. The middle region 222 faces towards the direct-lit LED array 5 directly.

In this embodiment, the brightness of the backlight of the backlight module can be controlled region by region. Regions illuminated by the backlight from the edge-lit LED arrays 4 are controlled by the light scattering structures 6 in the left region 221 and the right region 223 of the bottom surface 22 of the light guide panel while a region illuminated by the backlight from the direct-lit LED array 5 is controlled by the LED drive circuit.

Furthermore, when the light rays travel inside the light guide panel 2, the intensity of the light rays is gradually weakened with the increase in distance. The intensity of the light rays inside the light guide panel 2 adjacent to the edge-lit LED arrays 4 is stronger, and the intensity of the light rays away from the edge-lit LED arrays 4 is weaker. If the light scattering structures 6 on the bottom surface 22 of the light guide panel 2 have the same density at a position near the light source and a position away from the light source, then the light rays projected from the light guide panel 2 at the position near the light source have a larger intensity than the light rays projected from the light guide panel 2 at the position away from the light source. As viewed by human eyes, the position near the light source is bright and the position away from the light source is dark.

Thereby, the densities of the light scattering structures 6 on the bottom surface 22 of the light guide panel 2 are set as follows in this embodiment. The intensity of the light rays adjacent to the edge-lit LED arrays 4 is stronger, and correspondingly, the light scattering structures 6 are distributed with a smaller density; and the intensity of the light rays away from the edge-lit LED arrays 4 is weaker, and correspondingly, the light scattering structures 6 are distributed with a larger density. In this way, when the light rays are projected from the light guide panel 2, the light rays have a uniform intensity at the position near the light source and the position away from the light source, thereby improving the displaying effect of the liquid crystal panel.

Additionally, in this embodiment, the light scattering structures 6 are distributed on the bottom surface 22 of the light guide panel 2 at both ends of the 10 light guide panel 2 adjacent to the edge-lit LED arrays 4 while the bottom surface 22 of the light guide panel 2 above the direct-lit LED array 5 is not formed with the light scattering structures 6. According to this structural feature, the distance that the light emitted from the edge-lit LED arrays 4 travels is mainly related with distribution of the light scattering structures 6 on the bottom surface 22 of the light guide panel 2. When the regions illuminated by the edge-lit LED arrays 4 are controlled, the distance that the light rays of the edge-lit LED arrays 4 travel in the light guide panel 2 can be controlled by adjusting the distribution of the light scattering structures 6 on the bottom surface 22 of the light guide panel 2. Thereby, the light rays emitted by the edge-lit LED arrays 4 can be controlled within a certain region.

Furthermore, the regions in which the mesh point structures or micro-protrusion structures 6 on the bottom surface 22 of the light guide panel 2 are located shall extend beyond a peripheral region that can be illuminated by light emitted from an outermost LED of the direct-lit LED array 5. That is, the light 25 scattering structures 6 on the bottom surface 22 of the light guide panel 2 shall extend to an edge of an illuminating region of the direct-lit LED array 5. In this way, the brightness difference will not occur in a transition region between the regions formed with the light scattering structures 6 and the region that is not formed with the light scattering structures 6 on the light guide panel 2.

The region illuminated by the backlight from the direct-lit LED array 5 is controlled by the LED drive circuit. For example, when a film or video is played, both an upper end and a lower end of a screen are usually normally 5 black. If the two normally black regions correspond to the operating regions of the edge-lit LED arrays 4 exactly, then the two edge-lit LED arrays 4 can be turned off to save electric energy.

The aforesaid structure of this embodiment allows the brightness of the backlight to be controlled region by region. This can reduce the power consumption of the liquid crystal module and improve the backlight displaying effect of the backlight module.

Figure 2:
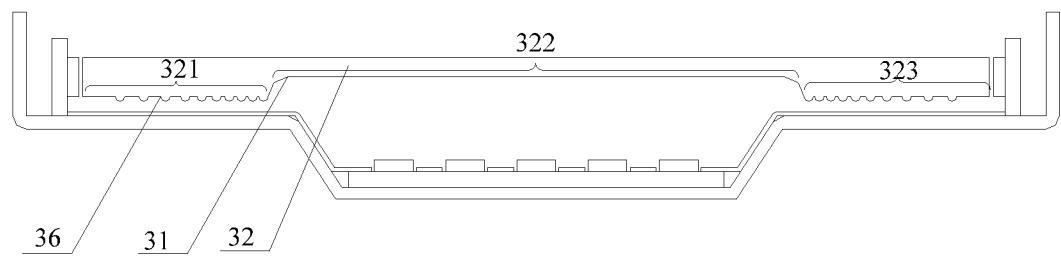
FIG. 2 is a schematic structural view of a second embodiment of the backlight module according to the present disclosure.

Referring to FIG. 2, there is shown a schematic structural view of a second embodiment of the backlight module according to the present disclosure. This embodiment is similar to the first embodiment except in that: in this embodiment, in a left region 321, a middle region 322 and a right region 323 on a bottom surface 31 of a light guide panel 32, the middle region 322 of the light guide panel 32 that is not formed with light scattering structures 36 has a thickness smaller than that of the other two regions 321, 323 formed with the light scattering structures 36; that is, a portion of the light guide panel 32 on which the middle region 322 on the bottom surface 31 of the light guide panel 32 is located has a smaller thickness, and portions of the light guide panel 32 on which the left region 321 and the right region 323 are located each have a larger thickness. This design can reduce the weight of the overall backlight module without degrading the effect of adjusting the 25 backlight region by region.

Others are the same as those in the first embodiment.

Figure 3:
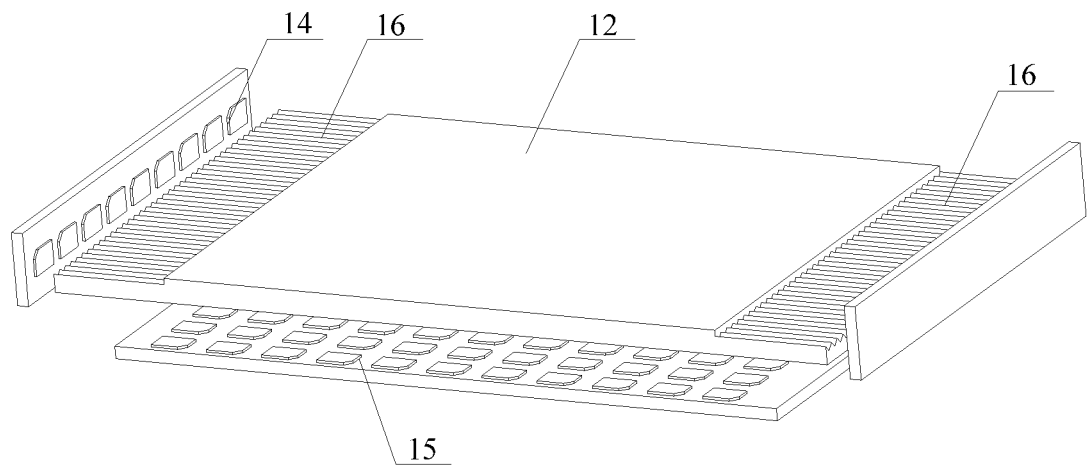
FIG. 3 is a schematic structural view of a third embodiment of the backlight module according to the present disclosure.
Figure 4:
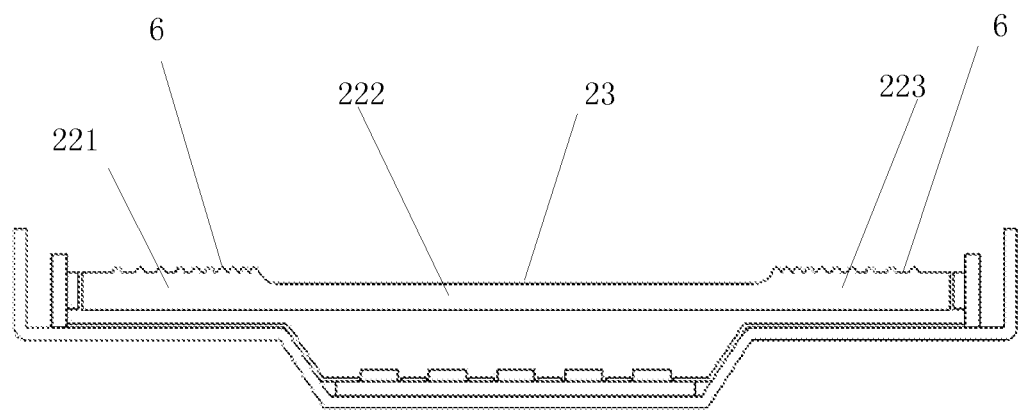
FIG. 4 is a schematic structural view of a fourth embodiment of the backlight module according to the present disclosure.

Referring to FIG. 3, there is shown a schematic structural view of a third embodiment of the backlight module according to the present disclosure. Similar to the first embodiment, this embodiment comprises edge-lit LED arrays 14, a direct-lit LED array 15, a light guide panel 12 and the like. This embodiment differs from the first embodiment in that: in this embodiment, light scattering structures 16 are not disposed on a bottom surface of the light guide panel 12, but are disposed on a light exiting surface of the light guide panel 12 at both ends of the light guide panel 12 adjacent to the edge-lit LED arrays 14. Others are the same as those in the first embodiment.

It shall be appreciated that, in actual applications, the aforesaid three embodiments may be combined with each other depending on actual requirements in order to arrive at or better achieve the objective of reducing the power consumption of the liquid crystal module and improving the backlight displaying effect of the backlight module.

Furthermore, the present disclosure further provides a liquid crystal display (LCD) comprising a backlight module. The backlight module may be the backlight module described in the aforesaid embodiments, and will not be further described herein.

According to the backlight module and the LCD comprising the same of the present disclosure, the direct-lit design and the edge-lit design are used in combination in the backlight module, and a number of light scattering structures for scattering light rays are disposed on the light exiting surface or the bottom surface of the light guide panel at both ends of the light guide panel to divide the light guide panel into three backlight regions. By using the light scattering structures to disrupt the total reflection of light rays inside the light guide panel, regions illuminated by the backlight from the edge-lit LED arrays are controlled by the light scattering structures on the light guide panel while a region illuminated by the backlight from the direct-lit LED array is controlled by the LED drive circuit. In this way, the effect of adjusting the brightness of the backlight of the backlight module region by region is improved and the power consumption of the liquid crystal module is reduced.

Furthermore, according to the present disclosure, the light scattering structures disposed on the light guide panel that are away from the edge-lit 5 LED arrays have a large density so that when the light rays of the edge-lit LED arrays are projected from the light guide panel, the light rays have a uniform intensity at the position near the light source and the position away from the light source, thereby improving the displaying effect of the liquid crystal panel.

Additionally, according to the present disclosure, the regions of the light guide panel in which the light scattering structures are located extend into an illuminating region of the direct-lit LED array so that the brightness difference will not occur in a transition region between the regions formed with the light scattering structures and the region that is not formed with the light scattering structures on the light guide panel.

What described above are only preferred embodiments of the present disclosure but are not intended to limit the scope of the present disclosure. Accordingly, any equivalent structural or process flow modifications that are made on basis of the specification and the attached drawings or any direct or indirect applications in other technical fields shall also fall within the scope of the present disclosure.

What is claimed is:

1. A backlight module, comprising a backplate, a direct-lit light emitting diode (LED) array, edge-lit LED arrays and a light guide panel, the backplate comprising a baseplate and side plates, the light guide panel being located between the side plates of the backplate and above the baseplate, the direct-lit LED array being disposed on the baseplate of the backplate and located beneath a middle portion of the light guide panel; the edge-lit LED arrays being disposed at two sides of the light guide panel and opposite to light incident surfaces of the light guide panel respectively; wherein a number of light scattering structures for scattering light rays are disposed on a light exiting surface of the light guide panel at both ends of the light guide panel adjacent to the edge-lit LED arrays; the baseplate is formed with a recessed portion and two supporting portions, the recessed portion is located between the two supporting portions and lower than the supporting portion, and the direct-lit LED array is disposed on the recessed portion; the light exiting surface of the light guide panel comprises a left region, a middle region and a right region, the light scattering structures are disposed in the left region and the right region rather than in the middle region, and the middle region without the light scattering structures formed therein faces away from the direct-lit LED array disposed on the recessed portion directly.

2. The backlight module of claim 1, wherein a density of the light scattering structures disposed in the left region and the right region of the light exiting surface of the light guide panel that are away from the edge-lit LED arrays is greater than a density of the light scattering structures that are near the edge-lit LED arrays.

3. The backlight module of claim 1, wherein the light scattering structures on the light exiting surface of the light guide panel extend to an edge of an illuminating region of the direct-lit LED array.

4. The backlight module of claim 1, wherein the light scattering structures are mesh point structures or micro-protrusion structures, and a cross section of the light scattering structures is at least one of a hill form, a spherical form, a triangular form, an elliptical form and a diamond form.

5. The backlight module of claim 1, wherein the light scattering structures on the light exiting surface of the light guide panel extend to an edge of the illuminating region of the direct-lit LED array.

6. The backlight module of claim 1, wherein two ends of the light guide panel formed with the light scattering structures have a thickness greater than that of the middle portion of the light guide panel that is not formed with the light scattering structures.

7. The backlight module of claim 1, further comprising a reflective sheet disposed on an upper surface of each of the supporting portions and in spaces between LEDs of the direct-lit LED array.

8. A liquid crystal display (LCD) comprising a backlight module, wherein the backlight module comprises a backplate, a direct-lit LED array, edge-lit LED arrays and a light guide panel, the backplate comprises a baseplate and side plates, the light guide panel is located between the side plates of the backplate and above the baseplate, the direct-lit LED array is disposed on the baseplate of the backplate and located beneath a middle portion of the light guide panel; the edge-lit LED arrays are disposed at two sides of the light guide panel and opposite to light incident surfaces of the light guide panel respectively, and a number of light scattering structures for scattering light rays are disposed on a light exiting surface of the light guide panel at both ends of the light guide panel adjacent to the edge-lit LED arrays; the baseplate is formed with a recessed portion and two supporting portions, the recessed portion is located between the two supporting portions and lower than the supporting portion, and the direct-lit LED array is disposed on the recessed portion; the light exiting surface of the light guide panel comprises a left region, a middle region and a right region, the light scattering structures are disposed in the left region and the right region rather than in the middle region, and the middle region without the light scattering structures formed therein faces away from the direct-lit LED array disposed on the direct-lit LED array directly.

9. The LCD of claim 8, wherein a density of the light scattering structures disposed in the left region and the right region of the light exiting surface of the light guide panel that are away from the edge-lit LED arrays is greater than a density of the light scattering structures that are near the edge-lit LED arrays.

10. The LCD of claim 9, wherein the light scattering structures on the light exiting surface of the light guide panel extend to an edge of an illuminating region of the direct-lit LED array.

11. The LCD of claim 8, wherein the light scattering structures are mesh point structures or micro-protrusion structures, and a cross section of the light scattering structures is at least one of a hill form, a spherical form, a triangular form, an elliptical form and a diamond form.

12. The LCD of claim 8, wherein two ends of the light guide panel formed with the light scattering structures have a thickness greater than that of the middle portion of the light guide panel that is not formed with the light scattering structures.

13. The LCD of claim 8, further comprising a reflective sheet disposed on an upper surface of each of the supporting portions and in spaces between LEDs of the direct-lit LED array.

14. A backlight module, comprising a backplate, a direct-lit light emitting diode (LED) array, edge-lit LED arrays and a light guide panel, the backplate comprising a baseplate and side plates, the light guide panel being located between the side plates of the backplate and above the baseplate, the direct-lit LED array being disposed on the baseplate of the backplate and located beneath a middle portion of the light guide panel; the edge-lit LED arrays being disposed at two sides of the light guide panel and opposite to light incident surfaces of the light guide panel respectively; wherein a number of light scattering structures for scattering light rays are disposed on a light exiting surface of the light guide panel at both ends of the light guide panel adjacent to the edge-lit LED arrays; the light exiting surface of the light guide panel comprises a left region, a middle region and a right region, and the light scattering structures on the light exiting surface are disposed in the left region and the right region rather than in the middle region; the middle region of the light exiting surface corresponds to the direct-lit LED array directly.

15. The backlight module of claim 14, wherein a density of the light scattering structures in the left region and the right region of the light exiting surface of the light guide panel that are away from the edge-lit LED arrays is greater than a density of the light scattering structures that are near the edge-lit LED arrays.

16. The backlight module of claim 15, wherein the light scattering structures on the light exiting surface of the light guide panel extend to an edge of the illuminating region of the direct-lit LED array.

17. The backlight module of claim 14, wherein the baseplate is formed with a recessed portion and two supporting portions, the recessed portion is located between the two supporting portions and lower than the supporting portion, and the direct-lit LED array is disposed on the recessed portion and corresponds to the middle region of the light exiting surface.

18. The backlight module of claim 14, wherein the light scattering structures are mesh point structures or micro-protrusion structures, and a cross section of the light scattering structures is at least one of a hill form, a spherical form, a triangular form, an elliptical form and a diamond form.

19. The backlight module of claim 14, wherein two ends of the light guide panel formed with the light scattering structures have a thickness greater than that of the middle portion of the light guide panel that is not formed with the light scattering structures.

* * * * *